(12) United States Patent
Kuo et al.

(10) Patent No.: US 6,230,288 B1
(45) Date of Patent: May 8, 2001

(54) METHOD OF TREATING WHITESPACE DURING VIRUS DETECTION

(75) Inventors: Chengi Jimmy Kuo, Torrance; Jivko Koltchev, Campbell; Dao-Chen Zheng, Cupertino, all of CA (US); Joseph Peter, Hillsboro, OR (US)

(73) Assignee: Network Associates, Inc., Santa Clara, CA (US)

( * ) Notice: Subject to any disclaimer, the term of this patent is extended or adjusted under 35 U.S.C. 154(b) by 0 days.

(21) Appl. No.: 09/181,880

(22) Filed: Oct. 29, 1998

(51) Int. Cl.[7] ..................................................... H02H 3/05
(52) U.S. Cl. ............................................. 714/38; 713/200
(58) Field of Search ................................. 714/38, 39, 49, 714/25; 713/200; 705/51

(56) References Cited

U.S. PATENT DOCUMENTS

| | | | |
|---|---|---|---|
| 5,283,856 | * | 2/1994 | Gross et al. ............................. 395/51 |
| 5,293,629 | * | 3/1994 | Conley et al. ....................... 395/700 |
| 5,752,058 | * | 5/1998 | Van De Vanter .................... 395/793 |
| 5,867,647 | * | 2/1999 | Haigh et al. .......................... 395/186 |
| 6,006,035 | * | 12/1999 | Nabahi ................................. 395/712 |

* cited by examiner

*Primary Examiner*—Norman M. Wright
(74) *Attorney, Agent, or Firm*—Pennie & Edmonds LLP

(57) ABSTRACT

A method is provided for detecting computer viruses that infect text-based files. In accordance with a preferred embodiment, a collection of virus signatures reflecting sequences of characters or instructions known to be found in such viruses is maintained on a computer system. A virus detection program is also maintained for the purpose of comparing the contents of computer files to the virus signatures. Upon execution of the virus detection program, whitespace within text-based files is transformed such that each sequence of whitespace characters is replaced by a single whitespace character. Virus signatures of viruses known to infect text files are similarly transformed. A transformed text-based file is then searched for at least one of said virus signatures. The user is alerted to a possible virus infection if any of the virus signatures are found in a file. In another preferred embodiment, an additional collection of at least one virus signature containing sequences of characters or instructions known to be found in viruses that infect executable computer files is maintained on the computer system. A transformed text-based file is searched for at least one of the additional virus signature, which are not transformed before the search.

23 Claims, 2 Drawing Sheets

METHOD OF TREATING WHITESPACE DURING VIRUS DETECTION

FIELD OF THE INVENTION

This invention relates to the field of computers and computer networks. In particular, the present invention relates to the treatment of whitespace while searching computer files for a computer virus.

BACKGROUND OF THE INVENTION

A computer virus can be defined as a sequence of commands or instructions that interfere with a user's operation of, or cause damage to, his or her computer system. Computer viruses may damage a computer system directly, such as by deleting files or formatting a disk, or indirectly, such as by altering the system's protective measures and thus making the computer vulnerable to probing or other attacks.

Computer viruses therefore present a significant threat to the integrity and reliability of computer systems and will continue to present such a threat due to the trend toward interconnection of computers. The increase in computer-to-computer communications, via the internet for example, has caused a commensurate increase in the spread of viruses because infected files are spread more easily and rapidly than ever before.

Virus detection is thus an essential element in the effective maintenance of computer systems. In order to detect a computer virus, a virus detection program is generally employed in conjunction with a series of virus "profiles" or "signatures" which represent characteristics or patterns of known viruses. One type of virus detection routine monitors a program suspected of being infected by a virus. The program's behavior is compared to a profile of operating characteristics of a known virus and, if a match is found, the program is assumed to contain a virus.

While virus creators once focused on binary executable computer files (e.g., those with .EXE or .COM file extensions), they have broadened their horizons to target, for example, macros (such as those executed by word processing or spreadsheet programs) and even text-based files (e.g., word processing files, ASCII text files, etc). While many text files are unsuitable for performing malicious actions on behalf of a virus creator, others, such as batch and script files, contain instructions that are executed in conjunction with binary executable programs.

By way of illustration, mIRC is an internet relay chat program that allows multiple computer users, using computers remote from each other, to "converse" via the internet. A communication channel, or "chat room," is established by a user wishing to discuss a topic. Within a chat room, a user at one computer types messages that are received and displayed on the screen of the other users in the same chat room. Users can come and go from conversations, establish private communication channels, etc.

Upon its invocation, and during its execution, mIRC automatically invokes a number of script files to perform various functions. For example, EVENTS.INI contains instructions that mIRC applies in response to certain messages or events (e.g., a particular user joins the conversation, a conversant uses a specified word or phrase, etc.). Another script file, COMMANDS.INI, lists shortcut commands a user may employ. If, for example, the user frequently sends a particular message or response, he or she may create a short command (similar to a macro) which, when entered, is translated by mIRC into the longer message or response.

When one known version of mIRC is started by a user, a script file named SCRIPT.INI is executed. One command that may be included in SCRIPT.INI places the user's computer into a file transfer mode. This mode, which can be turned on and off, allows remote users in the same chat room to search the storage units (e.g., disk drives) attached to a user's computer system and to retrieve files residing on those storage units. This mode can be beneficial in the sharing of information between users, but, if it is included in the user's SCRIPT.INI without the user's knowledge, the contents of his or her computer system become vulnerable to pilferage.

Another command that may be executed in SCRIPT.INI causes the user's SCRIPT.INI file to be automatically transmitted to the computer system of each person who joins the user's chat room. Upon receipt of the file, the remote user's existing SCRIPT.INI file may be overwritten with the received version. If the transferred SCRIPT.INI file also enables file transfer mode (as described above), the remote user's computer system will, unknown to the user, become vulnerable the next time the script file is run.

These two "features" of mIRC are, in combination, sometimes termed the "mIRC virus." The virus propagates like a worm (i.e., it copies the entire file as opposed to simply inserting viral code into an uninfected file) and exposes a user's computer system to probing and file theft.

Text files such as the script files used by mIRC contain various character and formatting codes which merely alter the appearance of the file and/or its output, but which have no effect upon the execution of script or batch commands within the file. For example, when individual commands within SCRIPT.INI are executed, individual words may be separated by one space character, two spaces, a dozen spaces, a line feed, a tab character, etc. These are generally known as "whitespace" because they are invisible characters that merely serve to separate visible, printable, characters.

When a text file is edited, its whitespace is often reformatted or rearranged in order to yield a particular textual appearance. The resulting text file may contain the identical sequence of printable characters as a known virus, but have as little as one difference in the whitespace dividing the characters of that sequence. Further, multiple text files infected with the same virus do not always manifest the virus in identical forms. For example, one text file may have been edited subsequent to its infection, thus altering the appearance of the resident virus (including whitespace within the virus). Although still capable of performing its intended task, the textual appearance of the virus in the one file is different from its appearance in a second, unmodified, infected text file. As a result, when both infected text files are searched for a specific pattern or sequence of commands representing the virus in its unmodified form, an infected file will not necessarily be identified. In other words, a viral signature that has been modified will not be detected by a virus detection program and the user will unknowingly continue to use an infected file.

With viruses that cause indirect damage, such as the mIRC virus, the user's computer may be exposed to probing attacks for an extended period of time before the user becomes aware of and purges the virus. Because the user is unlikely to notice any direct, obvious damage caused by the virus (e.g., deleted files, formatted disks), there is nothing to alert the user to the infection.

As a related problem, some virus detection programs falsely report the presence of a virus in a text file that merely describes or refers to a known virus. For example, a text or word processing file may contain at least one textual extract—such as messages or other viral indicators that have been known to appear on the display of an infected computer system—from viruses known to infect executable computer files. The extracts may be included in the text file for informational purposes, such as to educate users as to known virus symptoms. When a virus detection program searches computer files for viruses by using indicia such as these extracts, the program may erroneously report that the text or word processing file contains a virus.

There is, therefore, a need in the art for a method of detecting a text-based virus in a text file regardless of how the whitespace within the virus and the file is formatted. There is also a need for a method of reducing the frequency with which virus detection programs falsely identify text-based files as being infected.

SUMMARY OF THE INVENTION

In accordance with a preferred embodiment, a method is provided to uniformly transform whitespace within a text-based computer file so that each combination of non-whitespace characters within the file is separated by the same code, preferably a whitespace character or characters. In this embodiment, on a computer system having at least one computer file, a sequence of virus detection instructions is maintained for searching the files for at least one computer virus. A collection of virus signatures comprising computer-readable codes that are known or that are likely to be found in an infected file, or in a virus capable of infecting a file, is also maintained.

Prior to, or in conjunction with, searching a text computer file on the computer system for a virus that infects text files, whitespace (i.e., space, tab, line feed, etc.) within the file is transformed. Advantageously, each sequence of whitespace characters is replaced by a common whitespace sequence, illustratively a single space. A virus signature representing a virus known to infect text files is similarly transformed.

The virus detection instructions are then executed to compare a transformed virus signature to the contents of the transformed text file. Detection of a virus signature within the file indicates that the file is infected with the associated virus. A user is alerted if a file is determined to be infected.

In another preferred embodiment, the transformed text file is also searched for a virus signature associated with a virus that infects executable files. In this embodiment, the virus signature is not transformed before being compared to the file contents.

BRIEF DESCRIPTION OF THE DRAWINGS

These and other features and advantages of the preferred embodiments will become more readily apparent from the following detailed description, which should be read in conjunction with the accompanying drawings, in which.

DETAILED DESCRIPTION

Figure 1:
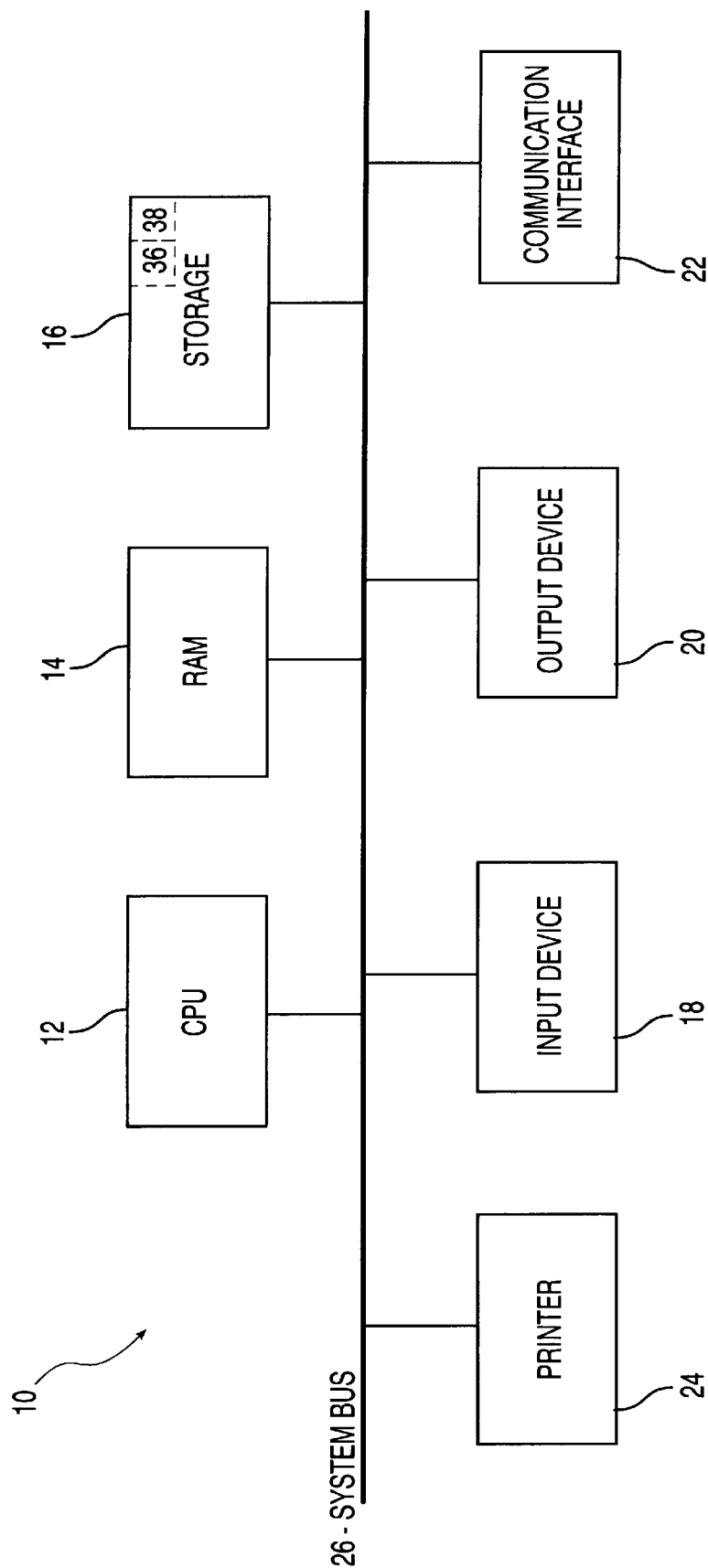
FIG. 1 is a block diagram of a representative computer system.

Referring to FIG. 1, there is shown a representative computer system in which a method in accordance with a preferred embodiment may be implemented. Computer system 10 illustratively incorporates an IBM-compatible personal computer, but one skilled in the art will understand that computer system 10 is not limited to a particular size, class or model of computer.

Computer system 10 includes a central processing unit ("CPU") 12, a memory unit 14, at least one storage device 16, input device 18, a display device 20, a communication interface 22, and a printer 24. A system bus 26 is provided for communicating between the above elements.

Storage device 16 illustratively includes at least one removable or fixed disk drive, compact disc, DVD, or tape. Input device 18 is a keyboard, mouse, or other similar device. Display device 20 illustratively is a computer display, such as a CRT monitor, LED display or LCD display. Communication interface 22 may be a modem, a network interface, or other connection to external electronic devices, such as a serial or parallel port. Printer 24 is a hard copy output device such as a laser printer, dot matrix printer, or plotter.

Storage devices 16 contain a virus detection program 36 (e.g., a search engine) and a file containing at least one virus signature 38. Virus signatures 38 are sequences of computer-readable characters that portray viruses found within textual and/or executable computer files in that they match the behavior exhibited by, or a series of characters found within, known viruses. Virus detection program 36 comprises computer-readable instructions which, when executed by CPU 12, search for viruses within computer files on storage devices 16 and/or memory unit 14. Viruses in these computer files are identified by the detection of tell-tale characteristics which match one of virus signatures 38.

Virus detection program 36 operates by opening files on computer 10 and searching each one for at least one virus signature 38. One efficacious program for searching computer files for virus signatures is VirusScan™, a leading antivirus application produced by Network Associates, Inc., formerly known as McAfee Associates. VirusScan™ is a software application offered for sale in a variety of forms by a number of vendors. VirusScan™ is accompanied by documentation in printed form (see, e.g., "VirusScan Quick Start Guide", McAfee Associates 1997, accompanying the CD-ROM version of VirusScan for Windows 95, Windows NT, Windows 3.1x, DOS and OS/2), in computer-readable form (see, e.g., the directory \MANUALS on the CD-ROM version of VirusScan for Windows 95, Windows NT, Windows 3.1x, DOS and OS/2) and on the World Wide Web at http://www.nai.com. The contents of these documents are hereby incorporated by reference into the present application. Other information related to VirusScan™ may be found in U.S. patent application Ser. No. 09/001,611, filed Dec. 31, 1997, the disclosure of which is hereby incorporated by reference into the present application.

In one form, the VirusScan™ application is adapted in accordance with the present invention for use on a user's client computer running on a Windows 95™ platform. A primary routine used by this antivirus application is "SCAN.EXE." In general, the program SCAN.EXE operates by comparing the contents of a file with at least one known virus signature to determine if there is match. In accordance with the present invention, the program SCAN.EXE has been adapted to serve as virus detection program 36 and to more effectively search for text-based viruses. Further, SCAN.EXE has been adapted to decrease or eliminate the erroneous detection of viruses within text or word processing files. Finally, SCAN.EXE retains its former capability of scanning executable files for viruses. In a typical configuration, SCAN.EXE draws upon at least one of the virus signature file, herein represented by the file name SCAN.DAT.

In accordance with a preferred embodiment, SCAN.EXE is modified to process text files on computer 10 prior to, or in conjunction with, being searched for virus signatures 38. As modified, SCAN.EXE transforms a text file's "whitespace." As used herein, "whitespace" refers to a set of whitespace characters or whitespace sequences that may be found in a computer file. A "whitespace sequence" refers to a sequence of at least one whitespace character, and "whitespace character" refers to a non-printable or invisible character that may be used for formatting or control purposes, illustratively including any or all of the following: space, backspace, tab, vertical tab, line feed, form feed, and carriage return. For example, in IBM-compatible personal computers the whitespace characters are the decimal ASCII character codes 8–13 and 32. In contrast, printable characters illustratively include alphanumeric characters (e.g., those with decimal ASCII character codes in the range 48–57, 65–90 and 97–122) as well as punctuation marks and typographic symbols (e.g., decimal ASCII character codes 33–47, 58–64, 91–96 and 123–126).

In particular, SCAN.EXE performs a whitespace transformation on the text file by replacing each of the various whitespace sequences found in the text file with a common whitespace sequence, e.g. a single whitespace character such as a space. All whitespace sequences within text-based files are thus transformed by SCAN.EXE to common, uniform, representations. The result of this transformation is text files in which words and other series of visible, printable, characters are separated only by a single, known, character. Therefore, when the transformed text file is to be searched, the search procedure need not be concerned with the myriad possible whitespace sequences that may have been found in the original file. This is advantageous because users may edit an infected text file before it is searched, and thereby modify whatever whitespace was originally included in the virus. Because of such user modifications, searching for a text virus based on a profile or signature including anything more than the basic whitespace formatting provided by the present invention will likely fail to find the virus in infected files that were edited.

Prior to being compared to the contents of the transformed text file, a virus signature that represents a text-based virus is also subjected to the same whitespace transformation applied to the text-based file. Thus, in a preferred embodiment, each whitespace sequence within the computer-readable characters of the virus signature is transformed to a single whitespace character, and this character is the same as the whitespace character inserted in the transformed text file. By uniformly transforming all whitespace sequences within both the virus signature and a file to be searched, a virus in an infected file is much more likely to be located.

In the presently described preferred embodiment, the file being searched is only transformed if it is a text file. It is, however, transformed not only when being searched for text-based viruses, but also when being searched for viruses that are known to attack executable files (e.g., those with .EXE or .COM extensions). As described below, by transforming the text file when searching for executable file viruses, the frequency with which false detections occur is decreased.

In particular, in some instances, a text file may simply report or list a known virus profile or signature (e.g., a message printed on the display of an infected computer system) that is associated with a virus that attacks executable files. In such a case, the text file is not actually infected but a comparison of the text file with at least one virus signature would be likely to yield a match and an incorrect indication that the text file was infected with a virus. However, by transforming the text file, including any internal references to or lists of virus profiles and signatures, but not transforming the signature of an executable virus before a match is attempted, it is unlikely that a match will be found. As a result, false detections of the executable virus within text-based files will be minimized.

Finally, when searching an executable file for virus signatures in accordance with a preferred embodiment, there is generally no transformation associated with the file or signatures in the signature file. Since executable files are not generally edited by users, there is generally no need to accommodate various whitespace formats. The whitespace configuration reflected in any file infected by an executable file virus will most likely match the whitespace configuration of the virus signature.

Thus, in a preferred embodiment, the following matrix identifies when to transform a file being searched for a virus or the virus signature representing the virus for which the file is being searched.

| When searching | For text virus | For executable virus |
| --- | --- | --- |
| Text files | Transform text file and virus signature | Transform text file, but not virus signature |
| Executable files | Transform virus signature. Do not transform file. | Do not transform file or virus signature |

Figure 2:
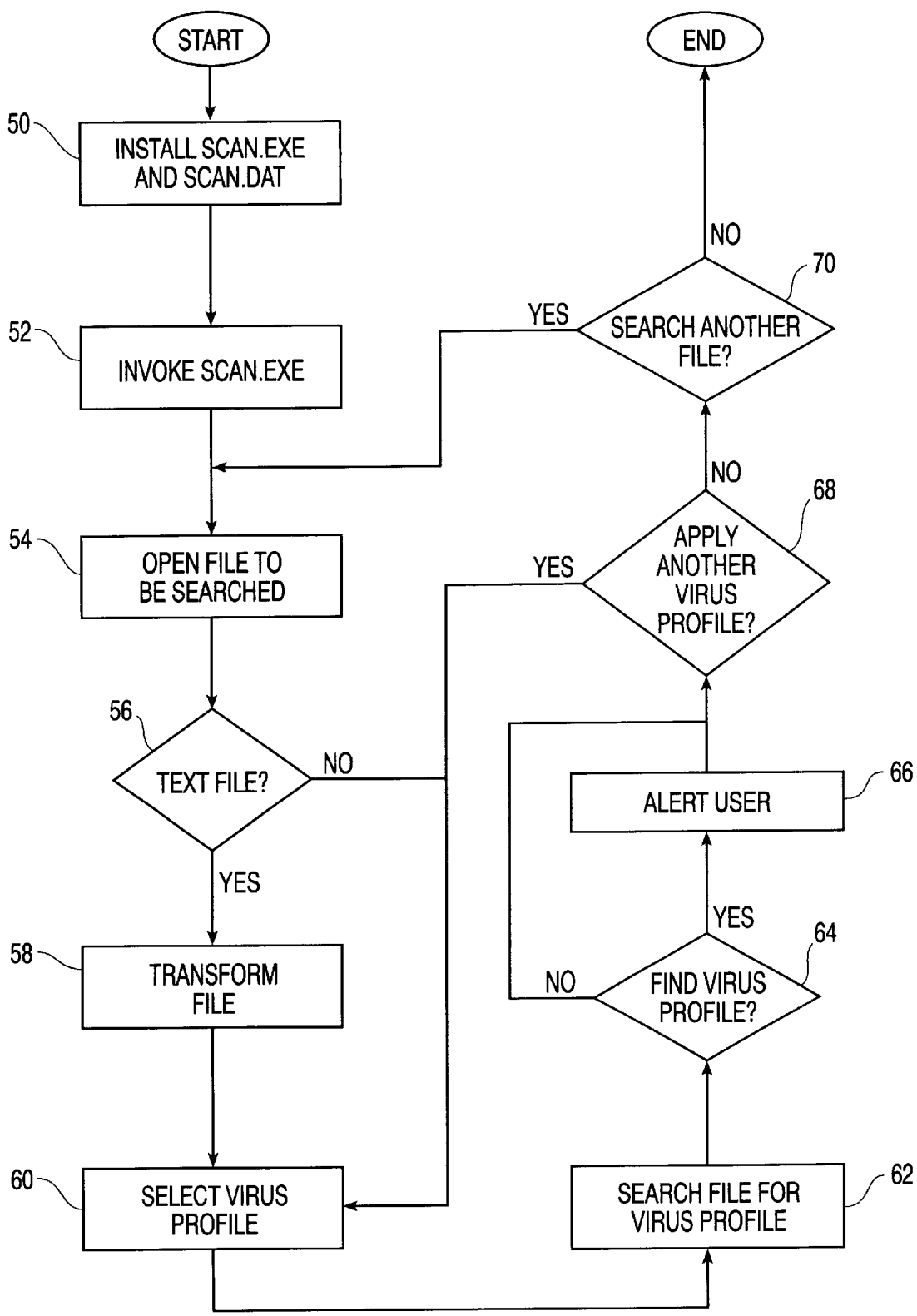
FIG. 2 is a flowchart demonstrating a method of treating whitespace in accordance with a preferred embodiment.

FIG. 2 is a flowchart demonstrating a method of treating whitespace in accordance with a preferred embodiment. In the illustrated method the virus detection procedure (e.g., the virus detection program SCAN.EXE) is invoked "on demand" by a system user. It is understood, however, that this method is easily modified for execution in response to a specified event (e.g., booting or shutting down computer system 10) or at a specified time (e.g., every night at a pre-scheduled time). SCAN.EXE can also be configured to search all or a subset of files on computer system 10. A user may choose to search files on all or a subset of storage devices and memory units and may choose to search only particular types of files (e.g., executable, text-based).

In step 50 SCAN.EXE, as modified with instructions capable of transforming text files, is installed on computer system 10 along with SCAN.DAT, which includes at least one virus signature. The virus signatures incorporated in SCAN.DAT represent virus behavior or sequences of characters derived from known and/or suspected viruses. The whitespace within virus signatures pertaining to text-based viruses is transformed, as discussed above, before such virus signatures are added to SCAN.DAT.

In step 52 a user invokes SCAN.EXE to search at least one file on computer system 10 for computer viruses. SCAN.EXE opens (step 54) a first file and determines (step 56) whether the file is an executable file (such as an executable program's object code) or a text file (such as script, batch, data and word processing files). At step 56, SCAN.EXE illustratively examines the first 100 characters of the file. As long as at least approximately 90% of them are printable characters, the file is considered a text file. For purposes of the presently illustrated embodiment, printable characters may include any or all whitespace characters (as described above), alphanumeric characters, punctuation marks, and typographic symbols. Illustratively, the ASCII character set comprising the decimal ranges of 8–13 and 32–126 are considered printable characters. One skilled in the art will understand that a wider range of characters may be considered printable without exceeding the scope of the preferred embodiments.

If determined to be a text-based file, the whitespace within the file is transformed (step 58) as described above. Subsequently, a virus signature from SCAN.DAT is selected (step 60) for comparison with the contents of either the executable file or the transformed text file.

If a text file is being searched for a virus that targets text files, the virus signature will already have been similarly transformed (e.g., prior to being added to SCAN.DAT). In particular, each whitespace sequence within the computer-readable characters of the virus signature will have been transformed to the same whitespace character, and that character will be identical to the character to which the text file whitespace is transformed.

Virus signatures relating to text-based viruses are illustratively identified as such at the time they are added to SCAN.DAT. Advantageously, flags in SCAN.DAT are set to indicate the type of virus that the virus signature represents and/or the type or types of files that the associated virus infects (e.g., executable, text-based). Thus, when added to SCAN.DAT in the presently illustrated preferred embodiment, text-based virus signatures that are to be compared to text files are transformed and segregated from virus signatures that are to be compared to executable files.

In another mode of operation, however, the original format of whitespace within the text-based virus signatures added to SCAN.DAT is left intact. In this mode of operation, then, the whitespace of such text-based virus signatures is transformed after the signature is selected to be compared to the contents of the executable or transformed text file.

The file, whether textual in nature or executable, is then searched (step 62) for the selected virus signature. If the virus signature is found (step 64) within the file, thus indicating the file is infected, a user is alerted (step 66).

If the virus signature is not found within the file (step 64), SCAN.EXE determines (step 68) whether the open file is to be searched for another virus signature. If the open file is to be searched for another signature, the illustrated method returns to step 60. Otherwise, SCAN.EXE determines (step 70) whether another file on computer system is to be searched. If not, the program exits; otherwise, SCAN.EXE resumes at step 54.

Various preferred embodiments have been described. The descriptions are intended to be illustrative, not limiting. Thus, it will be apparent to those skilled in the art that modifications may be made to the invention as described without departing from the scope of the claims set out below. For example, while preferred embodiments have been described in terms of transforming each whitespace sequence to a single whitespace character, it will be understood that other transformation procedures can be used. Generally speaking, methods of whitespace handling in accordance with the preferred embodiments are applicable wherever whitespace sequences between successive blocks of text are converted according to similar rules in both text files and the virus signatures associated with viruses that infect text files. A particularly advantageous rule is that all whitespace sequences, regardless of length or of the specific whitespace character content, are converted to the same code which comprises a whitespace character or characters.

One of skill in the art will also understand that text file whitespace sequences may instead be converted into other, non-whitespace, characters. For example, a visible, printable character or characters may be used to replace whitespace sequences between successive blocks of text in a particular word processing environment. In addition, there may be instances in which no transformation of the virus signature is necessary. For instance, the virus signature may have previously been transformed into a sequence in accordance with a whitespace transformation rule. In such case the original virus signature can be stored in a compressed format.

What is claimed is:

1. A method of searching a text-based computer file for a computer virus known to infect text-based files using a stored sequence of computer-readable characters associated with the computer virus, comprising the steps of:

transforming whitespace within the text-based file in accordance with a whitespace transformation rule to form a transformed text-based file;

transforming whitespace within the stored sequence of computer-readable characters in accordance with said whitespace transformation rule to form a transformed sequence of computer-readable characters; and searching said transformed text-based file for at least one occurrence of said transformed sequence of computer-readable characters, wherein the computer virus is detected upon an identification of at least one such occurrence.

2. The method of claim 1, said whitespace comprising at least one whitespace sequence, wherein said whitespace transformation rule is designed to transform said at least one whitespace sequence into a common predetermined whitespace sequence.

3. The method of claim 2, wherein said common predetermined whitespace sequence comprises a single whitespace character.

4. The method of claim 1, wherein prior to the step of transforming whitespace within the text-based file, a step of determining whether the computer file is indeed a text-based file is performed, said determining step comprising the steps of:

examining a predetermined number of characters in the computer file; and determining whether a percentage of the examined characters that are printable characters exceeds a predetermined percentage.

5. The method of claim 4, wherein said predetermined percentage is greater then or equal to 90 percent.

6. The method of claim 4, wherein printable characters comprise ASCII character codes in the decimal range of 8–13 and 32–126.

7. The method of claim 4, wherein said predetermined number of characters is greater than or equal to 100.

8. The method of claim 3, wherein said single whitespace character is a space character.

9. The method of claim 8, wherein said whitespace sequence comprises at least one from the group consisting of: space, tab, vertical tab, line feed, form feed, carriage return, and null characters.

10. The method of claim 1, said whitespace comprising at least one whitespace sequence, wherein said whitespace transformation rule is designed to transform said at least one whitespace sequence into a common predetermined non-whitespace sequence.

11. The method of claim 10, wherein said at least one whitespace sequence comprises at least one from the group consisting of: space, tab, vertical tab, line feed, form feed, carriage return, and null.

12. A method of searching for a virus in a computer file that includes whitespace, the method comprising the steps of:

storing at least one virus profile;

determining whether the computer file is a text file;

if the computer file is a text file, reformatting the contents of the computer file to convert a sequence of whitespace characters into a single code; and comparing the contents of the computer file with said at least one virus profile.

13. The method of claim 12 wherein said at least one virus profile comprises a plurality of whitespace characters, said method further comprising the step of transforming successive whitespace characters in said plurality of characters to a single code if the computer file is a text file.

14. The method of claim 12 wherein said single code is a space character.

15. The method of claim 12 wherein said sequence of whitespace characters comprises at least one from the group consisting of: space, tab, vertical tab, line feed, form feed, carriage return, and null.

16. The method of claim 12 wherein whitespace characters are non-printable computer-readable characters.

17. The method of claim 12 wherein said determining step comprises the steps of:

examining a predetermined number of characters in the file; and determining the percentage of the examined characters that are printable characters;

wherein said computer file is determined to be a text file if 90% or more of the predetermined number of characters are printable characters.

18. The method of claim 17 wherein printable characters comprise ASCII character codes in the decimal range of 8–13 and 32–126.

19. A method of searching a computer file for a computer virus comprising the steps of:

storing a virus profile comprising a sequence of computer-readable characters associated with a computer virus;

determining whether the computer file is a text-based file;

transforming whitespace within the computer file if the computer file is a text-based file; and searching said computer file for said virus profile.

20. The method of claim 19 further comprising the step of transforming whitespace thin the virus profile if the virus is known to infect text-based files.

21. The method of claim 19 wherein said transforming step comprises the steps of:

identifying a sequence of at least one whitespace character, said sequence containing only non-printable, computer-readable characters; and replacing said sequence of at least one whitespace character with a code.

22. The method of claim 21 wherein the code is a single whitespace character.

23. The method of claim 21 wherein the code is a single non-whitespace character.

* * * * *